(12) United States Patent
Yadav et al.

(10) Patent No.: US 11,907,877 B2
(45) Date of Patent: Feb. 20, 2024

(54) FULFILLING ORDERS USING SUPPLY FROM IDENTIFIED USERS

(71) Applicant: International Business Machines Corporation, Armonk, NY (US)

(72) Inventors: Saurabh Yadav, Bangalore (IN); Arvind Kumar, Bangalore (IN); Hiti Sinha, Pune (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/215,293

(22) Filed: Mar. 29, 2021

(65) Prior Publication Data

US 2022/0309429 A1 Sep. 29, 2022

(51) Int. Cl.
*G06Q 10/00* (2023.01)
*G06Q 10/0631* (2023.01)
*G06Q 30/0601* (2023.01)
*G06F 40/40* (2020.01)
*G06Q 30/0204* (2023.01)
*G06Q 10/087* (2023.01)

(52) U.S. Cl.
CPC ....... *G06Q 10/06315* (2013.01); *G06F 40/40* (2020.01); *G06Q 10/087* (2013.01); *G06Q 30/0205* (2013.01); *G06Q 30/0605* (2013.01); *G06Q 30/0635* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 6,604,089 B1 | 8/2003 | Van Horn | |
| 10,049,393 B1 | 8/2018 | Cearns | |
| 2003/0233246 A1* | 12/2003 | Snapp | G06Q 10/04 705/37 |

(Continued)

OTHER PUBLICATIONS

Freischlag, Christian, Using machine learning to personalize user experience, Aug. 28, 2020, Medium, https://towardsdatascience.com/using-machine-learning-to-personalize-user-experience-f5b6abd65602, p. 1-8 (Year: 2020).*

(Continued)

*Primary Examiner* — Joseph M Waesco
(74) *Attorney, Agent, or Firm* — Edward J. Wixted, III

(57) ABSTRACT

In an approach, a processor receives a request to purchase an item from a retailer, where the request includes a location. A processor receives a request to purchase an item from a retailer, where the request includes location information associated with a buyer. A processor identifies that the item is unavailable from the retailer. A processor determines a plurality of users predicted to have a surplus quantity of the item beyond each respective user's estimated needs at a time of the request. A processor sends an offer to the plurality of users to transfer the item in accordance with the request. A processor, responsive to receiving an acceptance of the offer, selects at least one accepting user, of the plurality of users, based on geographic proximity to the location information. A processor coordinates fulfillment of the request by the at least one user.

20 Claims, 4 Drawing Sheets

(56) References Cited

U.S. PATENT DOCUMENTS

| | | | |
|---|---|---|---|
| 2005/0010484 A1* | 1/2005 | Bohannon | G06Q 30/0641 |
| | | | 705/26.7 |
| 2006/0015416 A1* | 1/2006 | Hoffman | G06Q 10/06 |
| | | | 705/28 |
| 2011/0196760 A1* | 8/2011 | Howard | G06Q 30/0613 |
| | | | 705/26.41 |
| 2013/0144754 A1 | 6/2013 | Moser | |
| 2017/0206554 A1* | 7/2017 | Craft | G06Q 30/0641 |
| 2018/0342007 A1* | 11/2018 | Brannigan | G06Q 30/0643 |
| 2019/0347606 A1* | 11/2019 | Malecha | G06Q 30/0223 |
| 2019/0392501 A1* | 12/2019 | Kumaresan Nair | G06Q 30/08 |

OTHER PUBLICATIONS

Biswas et al., "A Decomposition Based Approach for Design of Supply Aggregation and Demand Aggregation Exchanges", FORTE 2004 Workshops, LNCS 3236, FORTE 2004, Sep. 27-30, 2004, Madrid, Spain, LNCS 3236, pp. 58-71, <https://link.springer.com/chapter/10.1007/978-3-540-30233-9_5>.

Gallo et al., "e-Fair: Aggregation in e-Commerce for Exploiting Economies of Scale", Cornell University, arXiv, Nov. 7, 2017, 12 pages, <https://www.researchgate.net/publication/320920659_e-Fair_Aggregation_in_e-Commerce_for_Exploiting_Economies_of_Scale>.

Kesav et al., "Enable Customers to Share an Item Packet with Large Quantity with Other Prospective Customers", An IP.com Prior Art Database Technical Disclosure, IP.com No. IPCOM000262119D, May 1, 2020, 3 pages, <https://priorart.ip.com/IPCOM/000262119>. Holdings Corporation.

\* cited by examiner

FULFILLING ORDERS USING SUPPLY FROM IDENTIFIED USERS

BACKGROUND

The present invention relates generally to the field of online retail services, and more particularly to fulfilling an order request for an out-of-stock item by identifying another user that has a surplus quantity of the item to supply the requested item.

Online retail is a form of electronic commerce which allows consumers to directly buy goods or services from a seller over the Internet using a web browser or application. Online retail provides added benefits and information to customers such as information, customer reviews, competitive pricing, and, typically, broader selections.

Social commerce is the use of one or more social networks in the context of online retail transactions. Social commerce is a subset of electronic commerce that involves using social media and user contributions to assist in the online buying and selling of products and services. Online social networks are well known, with examples including LinkedIn®, Facebook®, and various additional online social utilities that support social networking.

SUMMARY

According to one embodiment of the present invention, a computer-implemented method, computer program product, and computer system are provided. A processor receives a request to purchase an item from a retailer, where the request includes a location. A processor receives a request to purchase an item from a retailer, where the request includes location information associated with a buyer. A processor identifies that the item is unavailable from the retailer. A processor determines a plurality of users predicted to have a surplus quantity of the item beyond each respective user's estimated needs at a time of the request. A processor sends an offer to the plurality of users to transfer the item in accordance with the request. A processor, responsive to receiving an acceptance of the offer, selects at least one accepting user, of the plurality of users, based on geographic proximity to the location information. A processor coordinates fulfillment of the request by the at least one user.

DETAILED DESCRIPTION

Embodiments of the present invention recognize that the supply chain of available goods can be interrupted for any number of reasons. Particular regions may have supply chain interruptions due to, for example, poor weather conditions, raw material shortages, or emergency situations. Embodiments of the present invention recognize that when supply chains are disrupted and/or items are unavailable for purchase, there is a need for an approach to identify individual's that may have surplus items who might be willing to provide the items to other individual's with more immediate needs. Embodiments of the present invention further recognize that identifying users that are in common geographies may enable smoother and more reliable transactions between such users.

The present invention will now be described in detail with reference to the Figures.

Figure 1:
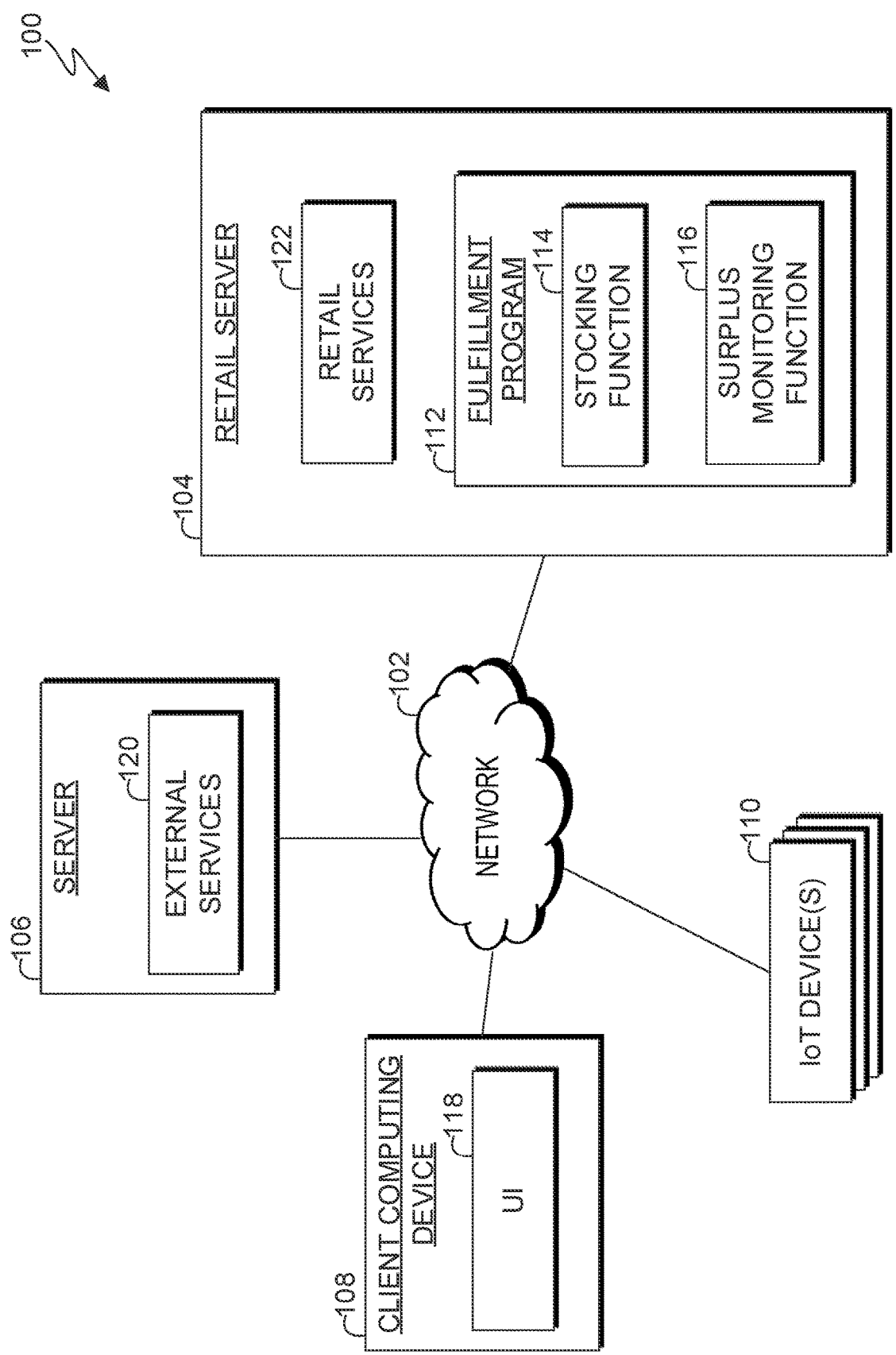
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes retail server 104, server 106, client computing device 108, and Internet of Things (IoT) device(s) 110 interconnected over network 102. Network 102 may be a local area network (LAN), a wire area network (WAN), such as the Internet, the public switched telephone network (PSTN), any combination thereof, or any combination of connections and protocols that will support communications between retail server 104, server 106, client computing device 108, and/or IoT device(s) 110, in accordance with embodiments of the present invention. Network 410 may include wired, wireless, or fiber optic connections. Computing environment 100 may include additional servers, computing devices, or other devices not shown.

Retail server 104 may be a management server, a web server, or any other electronic device or computing system capable of sending and receiving data and communicating with server 106, client computing device 108, and/or IoT device(s) 110 via, for example, network 102. In some embodiments, retail server 104 may represent a server computing system utilizing multiple computers as a server system, such as in a cloud computing environment. Retail server 104 may be an enterprise server capable of providing retail services to a large number of users. Retail server 104 contains retail services 122 and fulfillment program 112. Fulfillment program 112 includes stocking function 114 and surplus monitoring function 116. Retail server 104 may include components, as depicted and described in further detail with respect to FIG. 4.

Retail services 122 operate to provide retail services to users who access retail server 104. Retails services may include buying and selling goods and services, searching for items to purchase, saving items on an online shopping cart, creating and updating user profile information, storing order history, managing subscription orders (e.g., staple items that a user schedules to be purchased on regular basis, such as once per month), creating and sharing wish lists, browsing products, reviewing products, viewing generated recommendations, tracking shipped packages, targeted marketing and promotions, or performing other similar actions or services. In general, retail services 122 may include any retail-related actions or services provided by a retailer or seller of goods or services to a user, such as a user at client computing device 108 accessing retail services via user interface (UI) 118. In one embodiment, retail services 122 reside on retail server 104. In other embodiments, retail services 122 on another server or another computing device, provided that retail services 122 is accessible to client computing device 108, through UI 118, and fulfillment program 112.

Fulfillment program 112 operates to identify surplus items that have previously been purchased and/or obtained by users that correspond to items that are currently in low supply or out of stock. Users can opt in to the services provided by fulfillment program 112 after being informed as to how their data may be used. Further, users may elect to link one or more external services to their user profile that corresponds to fulfillment program 112. Linking external services may allow fulfillment program 112 to be granted permission to access data from such external services, based on access permissions and privacy restrictions enabled by the user associated with such external services. Fulfillment program 112 may utilize such linked external services along with profile information and/or user shopping history associated with retail services 122 in order to identify user shopping trends and recognize when a user might have a surplus of a particular item. If the particular item is out of stock or otherwise in low supply, in response to another user trying to purchase such a particular item, fulfillment program 112 may facilitate a transaction between the user with the item surplus (herein referred to as the selling user) and the user looking to purchase the out of stock item (herein referred to as the buying user). If multiple selling users exist, fulfillment program 112 may select a selling user based on geographic proximity to the buying user.

In one embodiment, fulfillment program 112 includes two functions: stocking function 114 and surplus monitoring function 116. In one embodiment, fulfillment program 112 resides on a retail server containing retail services, such as retail server 104 that contains retail services 122. In other embodiments, fulfillment program 112 may reside on another server, or another computing device, provided that fulfillment program 112 has access to retail services 122, UI 118, IoT devices 110 (or information provided by IoT devices 110), and/or external services 120. In some embodiments, fulfillment program 112 is integrated with a particular set of retail services, such as retail services 122. In other embodiments, fulfillment program 112 is an external application that may operate with multiple retail services. In such embodiments, fulfillment program 112 may be an external application implemented as a microservice or module. In some embodiments various retailers may implement the services provided by fulfillment program 112 to allow the system to operate across multiple retailers, rather than a single retailer. In such embodiments, each user (buyer or seller) may create an account with fulfillment program 112 and link one or more retail service accounts associated with a variety of retail services, such as retail services 122. Such a user may grant permission for order histories from multiple retailers to be aggregated such that consumption patterns and surplus item monitoring may be performed more accurately due to the increased access to user data. At any time users may grant or restrict what data is used and how that data is used and/or shared.

Stocking function 114 operates to coordinate fulfillment of orders for out of stock or low inventory items by identifying users that have previously purchased such items and are predicted to have a surplus of the item(s) desired. Stocking function 114 may generate and send offers to sell or otherwise provide such items to identified users and upon receiving acceptance of such an offer, provide instructions, shipping materials, and/or address information to the selling and/or buying user. In some embodiments, stocking function 114 selects a selling user based on location from the buying user. For example, a selling user that is geographically located close to the buying user may enable to transaction to be completed quickly, without requiring shipping services. In one embodiment, stocking function 114 may be integrated within retail services, such as retail services 122, such that stocking function 114 may operate within the user interface of the webpage, application, or platform. In some embodiments, user preferences related to fulfillment program 112 and/or stocking function 114 may be customizable by a user through UI 118 on client computing device 108. For example, a user may use UI 118 to link/unlink (i) external services, such as external services 120, (ii) retail services, such as retail services 122, (iii) access to IoT device(s) 110 or data provided by IoT device(s) 110. In additional a user may use UI 118 to change privacy settings or update user profile information (e.g., address, contact information). In some embodiments, the user profile information may include buyer and seller preferences regarding delivery (e.g., require shipping services, allow face-to-face delivery, share/hide address). Such preferences may be used to efficiently facilitate transactions.

Surplus monitoring function 116 operates to monitor purchases of individual users and uses a variety of factors to identify consumption patterns and recognize possible item surpluses that are available for particular users. As previously described, a user may use UI 118 to adjust privacy and/or other settings such that the user can dictate what information is monitored and accessible. Surplus monitoring function 116 may be used by stocking function 114 and/or fulfillment program 112 in determining whether users have a surplus of particular items.

Client computing device 108 may be a desktop computer, laptop computer, netbook computer, tablet computer, personal digital assistant (PDA), or smartphone. In general, client computing device 108 may be any electronic device or computing system capable of sending and receiving data and communicating with retail server 104, server 106, and/or IoT devices 110 via, for example, network 102. Client computing device 108 contains UI 118. Client computing device 118 may include components, as depicted and described in further detail with respect to FIG. 4.

UI 118 operates on client computing device 108 to visualize content from external services 120, retail services 122, and/or fulfillment program 112. In some embodiments, UI 118 is an application. UI 118 allows a user to view and input information in order to allow the user to take advantage of the services provided by external services 120, retail services 122, and/or fulfillment program 112. UI 118 may include one or more interfaces such as an operating system interface and one or more application interfaces. In one embodiment, UI 118 communicates with external services 120, retail services 122, and fulfillment program 112 through one or more application interfaces. In another embodiment, UI 118 may reside on another electronic device or computing system, provided that UI 118 can communicate with external services 120, retail services 122, and fulfillment program 112.

Server 106 may be a management server, a web server, or any other electronic device or computing system capable of receiving and sending data. In some embodiments, server 106 may be a laptop computer, tablet computer, personal computer (PC), a desktop computer, or any programmable electronic device capable of communicating with client computing device 108 and/or retail server 104. In some embodiments, server 106 may represent a server computing system utilizing clustered computers and components to act as a single pool of seamless resources. In the depicted embodiment, server 106 contains external services 120.

External services 120 may include a variety of services that are external to retail services 122. For example, external services may include messaging services, email clients, calendar services, social media services, IoT device services. In general, external services 120 include any external services that client computing device may access that could provide information relevant to fulfillment program 112 to aid in the identification of surplus items with users. A user may link any number of external services to a profile associated with fulfillment program 112 and grant fulfillment program 112 various levels of access to the resources provided by such external services.

IoT device(s) 110 may include a variety of IoT devices that can provide information to an IoT device service or directly to fulfillment program 112. In general, IoT device(s) 110 are associated with particular user accounts. In general, IoT device(s) 110 are physical objects, embedded with sensors, software, and other technologies, for the purpose of connecting and exchanging data with other devices and systems. Example IoT devices may include smart thermostats, smart lightbulbs, robotic vacuum cleaners, and printers. Many IoT devices are capable of generating maintenance schedules based on usage or other factors and identify when replacement parts or consumables need to be purchased. For example, some printers monitor ink levels and are able to identify when new ink cartridges or toner are required. Similarly, a smart thermostat may be able to identify when air filters should be replaced based on factors such as time since last replacement, feedback from the furnace or air conditioning units, or by recognizing efficiency differences in heating or cooling the dwelling. A variety of IoT devices may provide a details that can be used by fulfillment program 112 to identify whether replacement items will be necessary and/or whether such replacement items may currently be considered surplus items for particular users. Users may be able to permissively grant fulfillment program 112 IoT data via external services 120 or by a connection to IoT device(s) 110. Users may also restrict such access based on their personal privacy preferences.

Figure 2:
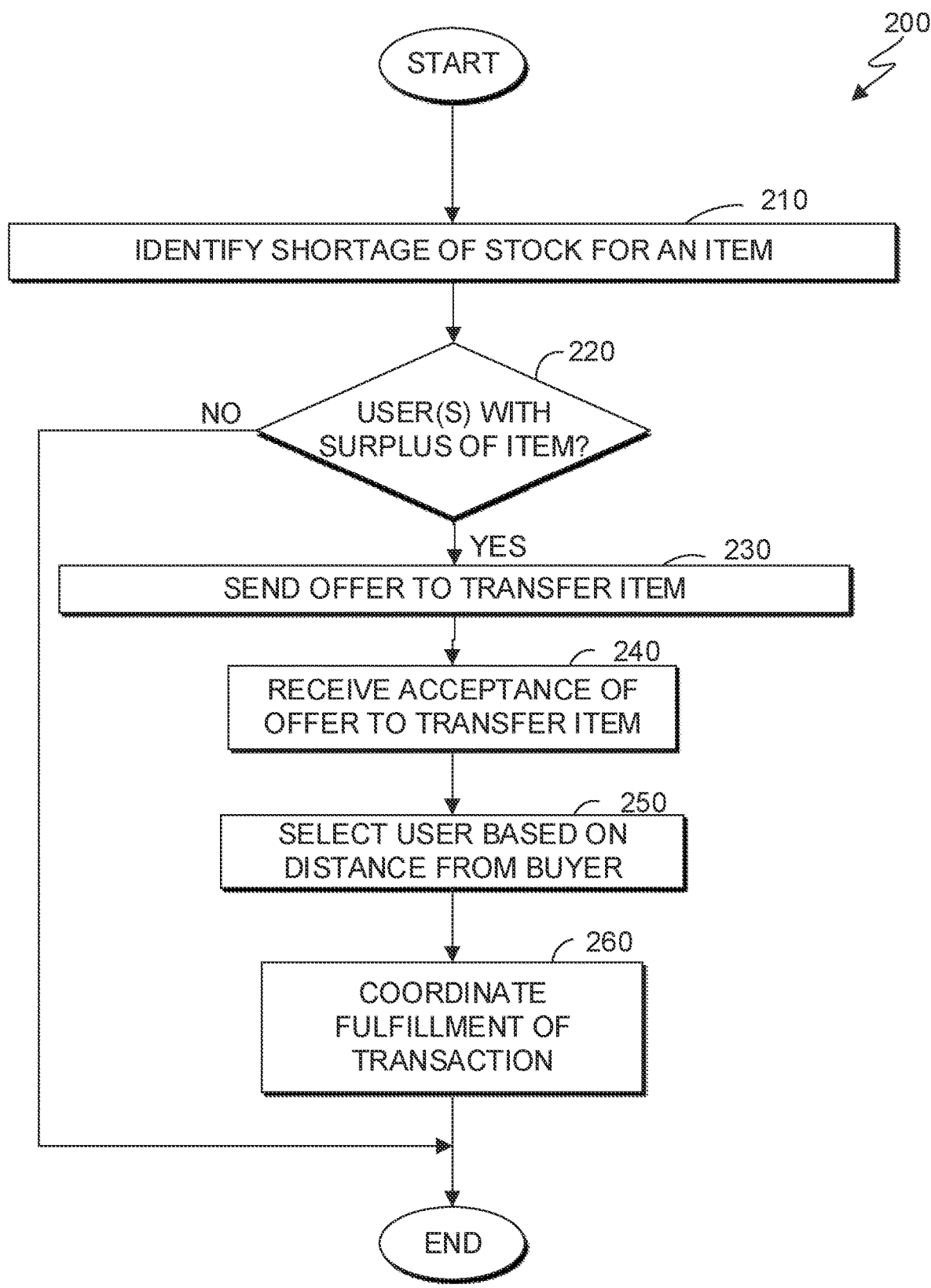
FIG. 2 is a flowchart depicting operational steps of a fulfillment program executing a stocking function within the computer environment of FIG. 1, for identifying existing users with a surplus supply of an item that has low availability or is out of stock and coordinating fulfillment of an order of the item using the existing user's surplus supply, in accordance with an embodiment of the present invention.

FIG. 2 depicts a flowchart 200 for the steps of stocking function 114, executing within computing environment 100 of FIG. 1, for coordinating the fulfillment of a request for an out of stock item by identifying projected surplus items from one or more users and coordinating a transaction to fulfill the request with the surplus item.

In one embodiment, initially, a user may indicate, within a user profile associated with either retail services 122 or fulfillment program 112, that the user is available to participate in a surplus item sharing/selling program. The user may link one or more external services 120 or IoT device(s) 110 to such a profile and grant retail services 122 and/or fulfillment program 112 access to data that fulfillment program 112 can use to determine whether the user has a surplus of particular items. As previously described, the user can dictate how their data can be used and can implement various privacy settings such that the user is able to restrict what data can be utilized.

In step 210, stocking function 114 identifies a shortage of stock for an item. In some embodiments, stocking function 114 coordinates with retail services 122 and identifies that a buying user is searching for a particular item that is out of stock or is not available in the quantities desired by the user. In some embodiments, stocking function 114 also receives location information, such as a location to which the buying user has requested that the item be shipped to.

In decision 220, stocking function 114 determines whether there are one or more existing users with an predicted surplus of the item specified in step 210. Stocking function 114 may determine whether there are such users by obtaining predicted item surplus data from surplus monitoring function 116. The details of how surplus monitoring function 116 identifies possible surplus items is described in further detail with respect to FIG. 3.

If stocking function 114 determines that there are no existing users with a predicted surplus of the identified item (decision 220, no branch), the process is complete.

If stocking function 114 determines that there are existing users with a predicted surplus of the identified item (decision 220, yes branch), in step 230, stocking function 114 sends one or more users an offer to transfer the identified item to the buying user. In some embodiments, stocking function 114 sends a single offer to a single potential selling user. In other embodiments, stocking function 114 sends the offer to multiple potential selling users in order to potentially increase the speed at which responses are received. In some embodiments, stocking function 114 sends the offer to the geographically closest N number of potential selling users to the desired shipping location of the request. In other embodiments, stocking function 114 sends the offer to the potential selling users who are predicted to have the highest quantities of surplus items in their inventory. In general, the offer may specify the item and quantity to be transferred. In some embodiments, compensation terms may be included in the offer as well. Compensation can take many forms but may include, for example, monetary compensation, and promotional compensation (e.g., gift cards, coupons, discounts, reward points). In some embodiments, the selling user will also be provided with terms describing how and/or when the item(s) they are transferring will be replaced. For example, stocking function 114 may state that the item will be replaced after the restocking of the item occurs with regards to retail services 122. Compensation and replacement terms may vary and may typically be decided administrative users of retail services 122 based on business needs associated with retail services 122. In some embodiments, compensation may be based on purchase patterns to be tailored to the specific user. In some embodiments, a set of pre-defined rules may be used to determine compensation terms prior to sending any offers. Stocking function 114 may provide offers to a client computing device such as client computing device 108 via any communication means. For example, stocking function 114 may generate an email, push notification, or text message to be sent to potential selling users. In some embodiments the offers include a specified time period by which response is requested and, if no response is received, the offer is revoked.

In some embodiments, when the item requested is a bundled product consisting of multiple component items, stocking function 114 may determine that there is not a single user that has all of the items that make up the bundled product, but that multiple users may be combined to provide each of the items that make up the bundled product (e.g., bundled product includes items A-C, user I only has items A-B, but user II has item C). In such instances, stocking function 114 may generate an offer request particular components items from each respective user so as to collectively coordinate fulfillment of the entire bundled product transfer.

In step 240, stocking function 114 receives an acceptance of the offer to transfer the item from one or more users. In general, stocking function 114 may receive one or more indications of acceptance in response to the sent offers (see step 230). In some embodiments, a user may elect to default to automatic acceptance of offers and in such instances an automated reply accepting the offer may be generated. In embodiments that include a specified time period, stocking function 114 may wait until the specified time period has elapsed and aggregate received offers.

In step 250, stocking function 114 selects one or more selling users. In some embodiments, a single user may have a quantity of items that is able to facilitate the item transfer. In some instances two or more users may be necessary to provide the quantity of items required. Further, there may be instances where the item requested were a bundled product, consisting of multiple different items, and while no individual user has a surplus of every item of the bundled product, in combination multiple users may have a surplus of the components that make up the bundled product and may be selected as selling users of the respective components. In some embodiments, stocking function 114 selects one or more users as selling users based on geographic distance from the buying user. In general, a geographically closer selling user may be able to more quickly and efficiently transfer the item to the buying user. In some embodiments, external services 120 are utilized to determine the geographically closer user. For example, stocking function 114 may utilize linked calendar information that indicates that both the buying user and the selling user are scheduled to be attending the same event. In another embodiment, stocking function 114 may utilize linked social media information to identify, for example, location check-ins, attending events, or other information that might identify a location of either the buying or selling user.

In step 260, stocking function 114 coordinates fulfillment of the transaction. Depending on the user preferences of the selling user and/or the buyer user, stocking function 114 provides any necessary information and/or supplies necessary to facilitate the transaction. In some embodiments, the buyer and/or the seller are provided with an address for a face-to-face transaction or address for shipping a package if the item is to be transferred via a shipment service. Stocking function 114 may cause retail services to deliver packaging supplies to the seller such as a box or envelope. In other embodiments, stocking function 114 may allow for monetary reimbursement of packaging supplies provided by the selling user to facilitate the transaction. Stocking function 114 may specify time periods for delivery. In some embodiments, stocking function 114 may specify a particular time period and location that corresponds to an event or calendar entry corresponding to both users, such as in situations where both the buyer and seller are attending events at similar locations. In some embodiments, stocking function 114 may coordinate with an external service such as a mapping service to provide directions to the buyer and/or seller. Based on the details of the offer that was accepted, stocking function 114 may process transactions related to compensation for the selling user, which may be processed either before or after the transaction of the item occurs. In some embodiments, stocking function 114 receives confirmation from the buyer when transfer of the item has been completed and, if transfer fails to be completed, stocking function 114 may generate notifications and queries to be sent to the buyer and/or seller in order to continue to coordinate and facilitate fulfillment of the request.

Figure 3:
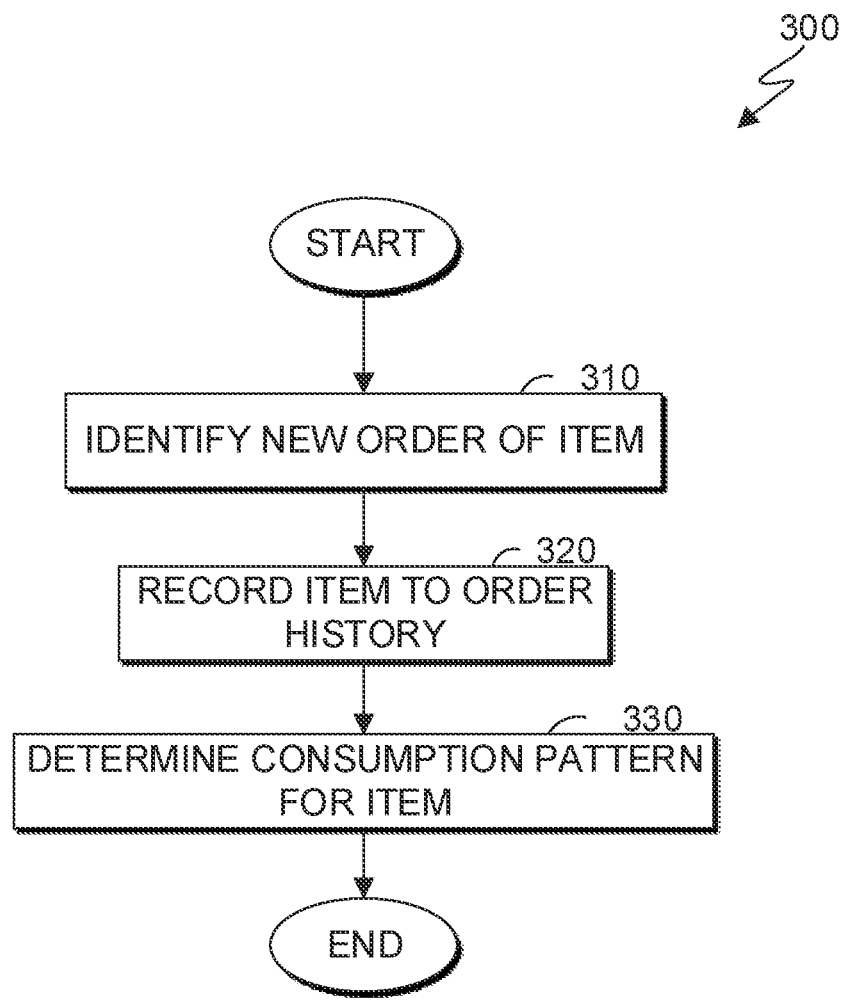
FIG. 3 is a flowchart depicting operation steps of a fulfillment program executing a surplus monitoring function within the computer environment of FIG. 1, for maintaining an order history of a user and determining consumption patterns to identify possible item surpluses, in accordance with an embodiment of the present invention.

FIG. 3 depicts a flowchart 300 for the steps of surplus monitoring function 116, executing within computing environment 100 of FIG. 1, for monitoring individual users and identifying the presence of surplus items in the respective user's inventory based consumption trends, IoT device information, and other factors. In general, surplus items are items that a user may have previously purchased and stored that are not actively being used. For example, a user may have a large supply of household items that are not actively in use and could be considered surplus items such as paper products, laundry detergent, air filters, office supplies, or other items.

In one embodiment, initially, a user may create or maintain a user profile that grants various permissions to fulfillment program 112 to utilize the user data to, for example, monitor user purchase history, gather IoT data, and utilize external services to identify consumption patterns and recognize any factors that might cause consumption patterns to deviate from the norm. While the following description discusses a variety of approaches surplus monitoring function 116 might utilize user data and access external services 120, it is recognized that the user would have access to settings to enhance privacy and restrict usage and access to their data to better tailor the system to the comfort level of the user. A user may opt-in to the services described herein and be in control of their user data.

In step 310, surplus monitoring function 116 identifies a new order of an item by the user. In some embodiments, retail services 122 sends a notification to surplus monitoring function 116 when the user places an order. In other embodiments, surplus monitoring function 116 monitors activity by the user on client computing device 108 to identify a new order.

In step 320, surplus monitoring function 116 records the purchased item to an order history for the user. In some embodiments, rather than maintaining the order history, surplus monitoring function 116 is granted access to an order history that is actively maintained by retail services 122. In some embodiments, for perishable items, surplus monitoring function 116 records an expiration date associated with the item.

In step 330, surplus monitoring function 116 determines a consumption pattern to associate with the item. Surplus monitoring function 116 may determine a consumption pattern based on a consideration of a number of factors relating to the item. For example, surplus monitoring function 116 may analyze the order history to determine the frequency at which a user has purchased the item in the past and a frequency at which the user might need the item. For example, surplus monitoring function 116 may recognize that the user purchases four bags of rice each month and predict that, after a week, the user has three bags of rice and would have a surplus of two bags of rice is a replacement is able to be provided within a week. Surplus monitoring function 116 may similarly identify item subscription services, whereby items are scheduled to be purchased on a recurring basis (e.g., monthly), as an indicator as to what quantity of the purchased items are consumed by the user over the time period corresponding to the recurring purchases.

Surplus monitoring function 116 may further consider the recorded expiration dates associated with, for example, perishable goods. Surplus monitoring function 116 may recognize that an expiration date is approach and, if the item is not predicted to have been used by the user, predict that the perishable goods that are approaching expiration are surplus goods.

As previously described, a user may grant surplus monitoring function 116 access to monitor IoT device(s) 110 or data generated by IoT device(s) 110. Such devices may generate notifications when replacement parts should be ordered or consumables are due for replacement. For example, a smart refrigerator may generate notifications that a water filter needs to be replaced, a smart thermostat may collect data indicating that an air filter needs to be replaced, and a printer may monitor ink levels to determine when and how frequent a user exhausts ink cartridges or toner. While these are but a few examples, surplus monitoring function 116 recognizes that a variety of IoT device(s) 110 may exist that generate data relating to the necessity of replacement parts or consumables and/or the frequency of such replacement over a time period for the device. Accordingly, surplus monitoring function 116 may be able to utilize such IoT information, in conjunction with purchase order history, to recognize that a user has a surplus of a particular item. For example, if a user has ten air filters and only uses one air filter every six months, surplus monitoring function 116 may predict that the user has a surplus of air filters. In another example, an IoT device may indicate that the user's dwelling experienced an event such as a power outage, and surplus monitoring function 116 may be able to infer, for example, that due to the power outage, the user likely used a higher number of candles than typically are consumed.

As has also previously been described, a user may grant surplus monitoring function 116 access to a variety of external services, such as external services 120. External services 120 may include email clients, messaging services, social media services, calendaring services, or any other external service that may include information relevant to a user's potential consumption of the item. Surplus monitoring function 116 may monitor unstructured data such as social media postings, text messages, or other communications by a user and utilize natural language processing (NLP) techniques to analyze the unstructured data and extract that the item in question has been mentioned or described in a post or message and that the user has also indicated some sort of impact on the consumption pattern associated with the item. For example, a user may specify an intention not to use said item or otherwise specify that the item may be available as a potential surplus item. For example, surplus monitoring function 116 may monitor, using NLP techniques, that a user has sent a text message to a friend stating that the user has extra hand sanitizer if they friend wants to have some. Similarly, surplus monitoring function 116 may monitor that a user has generated a post on social media that mentions the user received an unwanted item as a gift or was double gifted the and said unwanted or double gifted item cannot be returned. In such instances, surplus monitoring function 116 may identify potential surplus items from the communications. In other instances, surplus monitoring function 116 may be able to infer a change in expected consumption patterns due to calendar posts, social media events, or other communication methods. For example, a user's calendar may show that the user is going on vacation for two weeks and surplus monitoring function 116 may be able to identify items that are unlikely to be consumed at the historical rate when the user is on vacation. As such, surplus monitoring function 116 may be able to predict that items are surplus items.

In general, surplus monitoring function 116 may use any or all of the factors described herein to determine user consumption patterns for a particular item and thus, identify potential surplus items. Embodiments of the present invention recognize that surplus monitoring function 116 may utilize other factors not described in determining consumption patterns and potential surplus items and that any factors that could be utilized to indicate trends as to whether particular items are used and in what quantities said items are consumed. The output of surplus monitoring function 116 includes consumption patterns for individual items in a user's inventory and these consumption patterns can be utilized by stocking function 114 and fulfillment program 112 to predict potential surplus items that might be available and can generate offers for each user based on the predicted surplus items.

Surplus monitoring function 116 may utilize machine learning techniques to enhance the accuracy of consumption patterns over time. In different applications of surplus monitoring function 116 a series of weights may be applied to the different factors and the weights may be adjusted based on the success or failure of the identified consumption patterns in accurately identifying surplus items. For example, surplus monitoring function 116 may take each rejected offer by the user as feedback and adjust weights of the various factors to attempt to increase the accuracy of future predictions. Similarly, each accepted offer may act as an affirmation that the consumption patterns identified for the item are correct. In some embodiments, weights may be adjusted on a per item basis. In other embodiments, weight may be adjusted on a per user basis. In still other embodiments, as new users are added to the system, surplus monitoring function 116 may apply weights similar to that of other users whom accept offers above a particular threshold percent.

Figure 4:
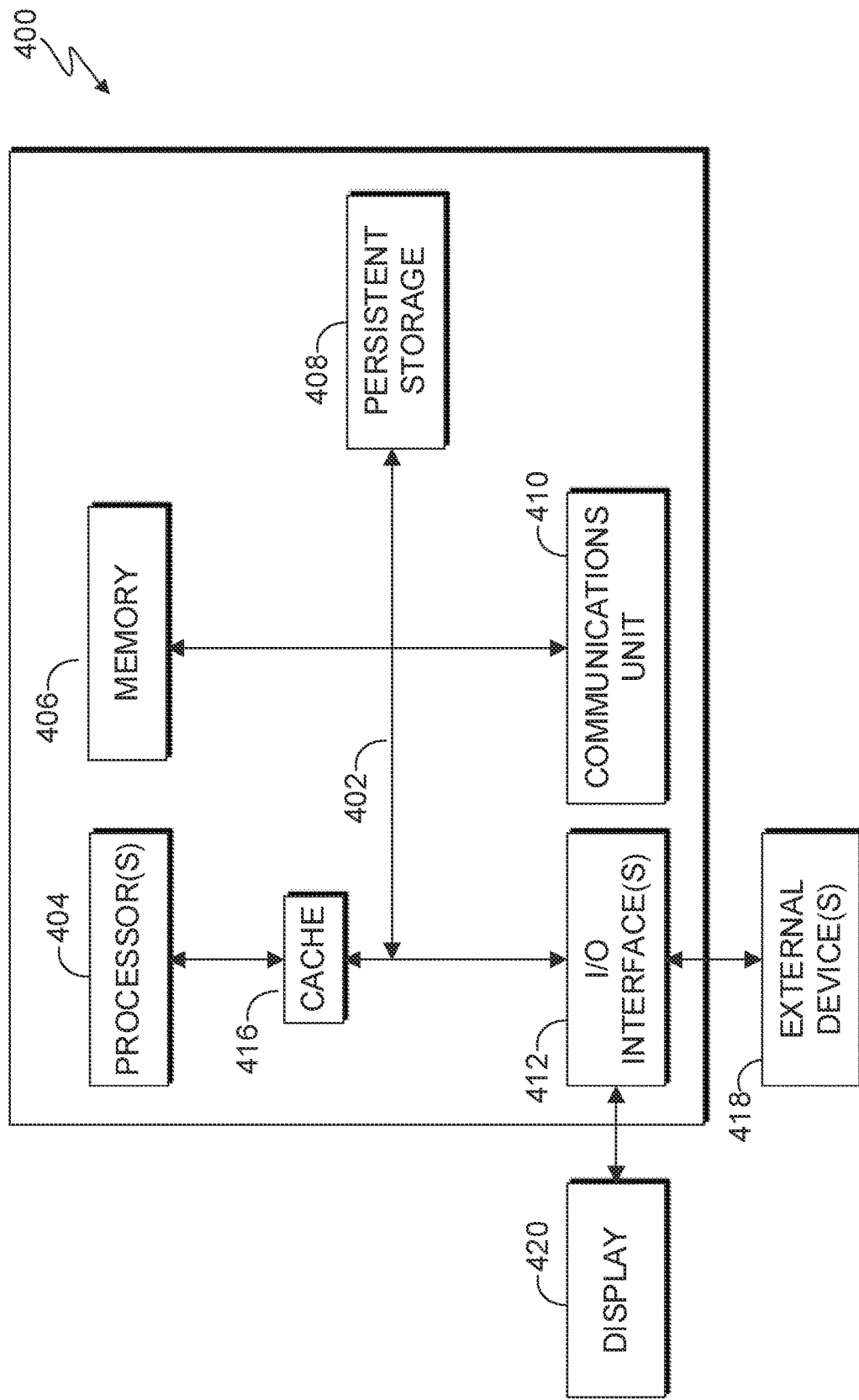
FIG. 4 is a block diagram of components of the client computing device, Internet of things (IoT) device(s), server, and retail server of FIG. 1, in accordance with an embodiment of the present invention.

FIG. 4 depicts a block diagram 400 of components of retail server 104, server 106, client computing device 108, and/or IoT device(s) 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Retail server 104, server 106, client computing device 108, and IoT device(s) 110 may each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Fulfillment program 112, stocking function 114, surplus monitoring function 116, and retail services 122 may be stored in persistent storage 408 of retail server 104 and in memory 406 of retail server 104 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Fulfillment program 112, stocking function 114, and surplus monitoring function 116 may be downloaded to persistent storage 408 through communications unit 410.

I/O interface(s) 412 allows for input and output of data with other devices that may be connected to retail server 104, server 106, client computing device 108, and/or IoT device(s) 110. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., fulfillment program 112, stocking function 114, and surplus monitoring function 116, can be stored on such portable computer readable storage media and can be loaded onto persistent storage 408 of retail server 104 via I/O interface(s) 412 of retail server 104. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a request to purchase an item from a retailer, wherein the request includes location information associated with a buyer;
   identifying, by one or more processors, that the item is unavailable from the retailer;
   determining, by one or more processors using a machine learning technique that utilizes one or more weights, a plurality of users predicted to have a surplus quantity of the item beyond each respective user's estimated needs at a time of the request, wherein the plurality of users previously purchased the item from the retailer, the determination further based on:
      monitoring previous purchases of the item from the retailer by the plurality of users; and
      previous adjustments to the one or more weights in response to inputting previous offers as feedback along with previous responses to at least one previously sent offer to transfer the item;
   sending, by one or more processors, an offer to the plurality of users determined, using the machine learning technique, to have the surplus quantity of the item, to transfer the item to the buyer in accordance with the request;
   adjusting, by one or more processors, the one or more weights of the machine learning technique, for subsequent determinations of users predicted to have subsequent surplus quantities of the item, based on inputting the offer as feedback along with responses to the offer from the plurality of users, each response indicating whether the offer was accepted by a respective user of the plurality of users;
   responsive to receiving an acceptance of the offer to transfer the item, selecting, by one or more processors, at least one accepting user, of the plurality of users, based on geographic proximity of the at least one accepting user to the location information associated with the buyer being closer than other users of the plurality of users; and
   coordinating, by one or more processors, fulfillment of the request by the selected at least one accepting user via a transfer of the item from the selected at least one accepting user to the buyer.

2. The computer-implemented method of claim 1, wherein:
   the item is a bundled product comprising a first component and a second component;
   determining the plurality of users predicted to have a surplus quantity of the item beyond each respective user's estimated needs at the time of the request comprises:
      determining, by one or more processors, a first subset of the plurality of users is predicted to have a surplus quantity of the first component; and
      determining, by one or more processors, a second subset of the plurality of users is predicted to have a surplus quantity of the second component; and
   selecting the at least one accepting user comprises:
      selecting, by one or more processors, a first user from the first subset of the plurality of users to provide the first component; and
      selecting, by one or more processors, a second user form the second subset of the plurality of users to provide the second component.

3. The computer-implemented method of claim 1, wherein determining that the plurality of users predicted to have a surplus quantity of the item beyond each respective user's estimated needs at the time of the request comprises, for each respective user:
   determining, by one or more processors, a consumption pattern for the item based on an order history of the item associated with the respective user; and
   predicting, by one or more processors, a surplus quantity of the item based on the consumption pattern and the order history.

4. The computer-implemented method of claim 3, wherein the consumption pattern is further based on Internet of things (IoT) data corresponding to usage of the item.

5. The computer-implemented method of claim 3, wherein the consumption pattern is further based on unstructured data posted in a communication medium, further comprising:
analyzing, by one or more processors, the unstructured data, using natural language processing techniques, to extract information describing an impact to usage of the item.

6. The computer-implemented method of claim 1, wherein the location information is based on a first calendar entry of the buyer, further comprising:
determining, by one or more processors, geographic proximity of a respective user to the location information based on a comparison between a first locations associated with the calendar entry of the buyer and a second location associated with a second calendar entry of the respective user, wherein the first calendar entry and the second calendar entry occur at overlapping time periods.

7. The computer-implemented method of claim 1, wherein, responsive to receiving the acceptance of the offer and selecting the at least one accepting user, coordinating fulfillment of the request by the buyer to purchase the item comprises causing, by one or more processors, shipping supplies to be provided to the at least one user to facilitate the at least one user sending the item to the buyer.

8. The computer-implemented method of claim 1, wherein sending the offer to the plurality of users further comprises providing, by one or more processors, the plurality of users with terms describing how and when the item will be replaced.

9. A computer program product comprising:
one or more computer readable storage media, and program instructions collectively stored on the one or more computer readable storage media, the program instructions comprising:
program instructions to receive a request to purchase an item from a retailer, wherein the request includes location information associated with a buyer;
program instructions to identify that the item is unavailable from the retailer;
program instructions to determine, using a machine learning technique that utilizes one or more weights, a plurality of users predicted to have a surplus quantity of the item beyond each respective user's estimated needs at a time of the request, wherein the plurality of users previously purchased the item from the retailer, the determination further based on:
monitoring previous purchases of the item from the retailer by the plurality of users; and
previous adjustments to the one or more weights in response to inputting previous offers as feedback along with previous responses to at least one previously sent offer to transfer the item;
program instructions to send an offer to the plurality of users determined, using the machine learning technique, to have the surplus quantity of the item, to transfer the item to the buyer in accordance with the request;
program instructions to adjust the one or more weights of the machine learning technique, for subsequent determinations of users predicted to have subsequent surplus quantities of the item, based on inputting the offer as feedback along with responses to the offer from the plurality of users, each response indicating whether the offer was accepted by a respective user of the plurality of users;
program instructions to, responsive to receiving an acceptance of the offer to transfer the item, select at least one accepting user, of the plurality of users, based on geographic proximity of the at least one accepting user to the location information associated with the buyer being closer than other users of the plurality of users; and
program instructions to coordinate fulfillment of the request by the selected at least one accepting user via a transfer of the item from the selected at least one accepting user to the buyer.

10. The computer program product of claim 9, wherein:
the item is a bundled product comprising a first component and a second component;
program instructions to determine the plurality of users predicted to have a surplus quantity of the item beyond each respective user's estimated needs at the time of the request comprise:
program instructions, collectively stored on the one or more computer readable storage media, to determine a first subset of the plurality of users is predicted to have a surplus quantity of the first component; and
program instructions, collectively stored on the one or more computer readable storage media, to determine a second subset of the plurality of users is predicted to have a surplus quantity of the second component; and
program instructions to select the at least one accepting user comprise:
program instructions, collectively stored on the one or more computer readable storage media, to select a first user from the first subset of the plurality of users to provide the first component; and
program instructions, collectively stored on the one or more computer readable storage media, to select a second user form the second subset of the plurality of users to provide the second component.

11. The computer program product of claim 9, wherein program instructions to determine that the plurality of users predicted to have a surplus quantity of the item beyond each respective user's estimated needs at the time of the request comprise, for each respective user:
program instructions, collectively stored on the one or more computer readable storage media, to determine a consumption pattern for the item based on an order history of the item associated with the respective user; and
program instructions, collectively stored on the one or more computer readable storage media, to predict a surplus quantity of the item based on the consumption pattern and the order history.

12. The computer program product of claim 11, wherein the consumption pattern is further based on Internet of things (IoT) data corresponding to usage of the item.

13. The computer program product of claim 11, wherein the consumption pattern is further based on unstructured data posted in a communication medium, further comprising:
program instructions, collectively stored on the one or more computer readable storage media, to analyze the unstructured data, using natural language processing techniques, to extract information describing an impact to usage of the item.

14. The computer program product of claim 9, wherein the location information is based on a first calendar entry of the buyer, further comprising:
  program instructions, collectively stored on the one or more computer readable storage media, to determine geographic proximity of a respective user to the location information based on a comparison between a first locations associated with the calendar entry of the buyer and a second location associated with a second calendar entry of the respective user, wherein the first calendar entry and the second calendar entry occur at overlapping time periods.

15. A computer system comprising:
  one or more computer processors, one or more computer readable storage media, and program instructions collectively stored on the one or more computer readable storage media for execution by at least one of the one or more computer processors, the program instructions comprising:
  program instructions to receive a request to purchase an item from a retailer, wherein the request includes location information associated with a buyer;
  program instructions to identify that the item is unavailable from the retailer;
  program instructions to determine, using a machine learning technique that utilizes one or more weights, a plurality of users predicted to have a surplus quantity of the item beyond each respective user's estimated needs at a time of the request, wherein the plurality of users previously purchased the item from the retailer, the determination further based on:
    monitoring previous purchases of the item from the retailer by the plurality of users; and
    previous adjustments to the one or more weights in response to inputting previous offers as feedback along with previous responses to at least one previously sent offer to transfer the item;
  program instructions to send an offer to the plurality of users determined, using the machine learning technique, to have the surplus quantity of the item, to transfer the item to the buyer in accordance with the request;
  program instructions to adjust the one or more weights of the machine learning technique, for subsequent determinations of users predicted to have subsequent surplus quantities of items the item, based on inputting the offer as feedback along with responses to the offer from the plurality of users, each response indicating whether the offer was accepted by a respective user of the plurality of users;
  program instructions to, responsive to receiving an acceptance of the offer to transfer the item, select at least one accepting user, of the plurality of users, based on geographic proximity of the at least one accepting user to the location information associated with the buyer being closer than other users of the plurality of users; and
  program instructions to coordinate fulfillment of the request by the selected at least one accepting user via a transfer of the item from the selected at least one accepting user to the buyer.

16. The computer system of claim 15, wherein:
  the item is a bundled product comprising a first component and a second component;
  program instructions to determine the plurality of users predicted to have a surplus quantity of the item beyond each respective user's estimated needs at the time of the request comprise:
    program instructions, collectively stored on the one or more computer readable storage media for execution by at least one of the one or more computer processors, to determine a first subset of the plurality of users is predicted to have a surplus quantity of the first component; and
    program instructions, collectively stored on the one or more computer readable storage media for execution by at least one of the one or more computer processors, to determine a second subset of the plurality of users is predicted to have a surplus quantity of the second component; and
  program instructions to select the at least one accepting user comprise:
    program instructions, collectively stored on the one or more computer readable storage media for execution by at least one of the one or more computer processors, to select a first user from the first subset of the plurality of users to provide the first component; and
    program instructions, collectively stored on the one or more computer readable storage media for execution by at least one of the one or more computer processors, to select a second user form the second subset of the plurality of users to provide the second component.

17. The computer system of claim 15, wherein program instructions to determine that the plurality of users predicted to have a surplus quantity of the item beyond each respective user's estimated needs at the time of the request comprise, for each respective user:
  program instructions, collectively stored on the one or more computer readable storage media for execution by at least one of the one or more computer processors, to determine a consumption pattern for the item based on an order history of the item associated with the respective user; and
  program instructions, collectively stored on the one or more computer readable storage media for execution by at least one of the one or more computer processors, to predict a surplus quantity of the item based on the consumption pattern and the order history.

18. The computer system of claim 17, wherein the consumption pattern is further based on Internet of things (IoT) data corresponding to usage of the item.

19. The computer system of claim 17, wherein the consumption pattern is further based on unstructured data posted in a communication medium, further comprising:
  program instructions, collectively stored on the one or more computer readable storage media for execution by at least one of the one or more computer processors, to analyze the unstructured data, using natural language processing techniques, to extract information describing an impact to usage of the item.

20. The computer system of claim 15, wherein the location information is based on a first calendar entry of the buyer, further comprising:
  program instructions, collectively stored on the one or more computer readable storage media for execution by at least one of the one or more computer processors, to determine geographic proximity of a respective user to the location information based on a comparison between a first locations associated with the calendar entry of the buyer and a second location associated with a second calendar entry of the respective user, wherein the first calendar entry and the second calendar entry occur at overlapping time periods.

\* \* \* \* \*